US004001651B2

United States Statutory Invention Registration [19]

[11] Reg. Number: H1651

[45] Published: Jun. 3, 1997

Aubert et al.

[54] EXTRACTION AND DISPOSAL OF ORGANIC WASTES WITH POLYMER COATED POROUS SUBSTRATE

[76] Inventors: Winton G. Aubert, 6604 Oakmont Ct., Plano, Tex. 75093; Wayne A. Kriel, 6713 Creekside, Plano, Tex. 75023

[21] Appl. No.: 429,894

[22] Filed: Apr. 27, 1995

[51] Int. Cl.[6] ..... B01D 15/04; C02F 1/28

[52] U.S. Cl. ..... 210/691

[58] Field of Search ..... 210/690, 691, 210/692, 693, 679, 908, 909

[56] References Cited

U.S. PATENT DOCUMENTS

| | | | |
|---|---|---|---|
| 2,367,384 | 1/1945 | Tymstra | 210/680 |
| 3,520,806 | 7/1970 | Haigh | 210/692 |
| 3,591,494 | 7/1971 | Crouch et al. | 210/693 |
| 3,617,566 | 11/1971 | Oshima | 210/692 |
| 3,674,683 | 7/1972 | Rainer | 210/692 |
| 3,676,357 | 7/1972 | Ciuti et al. | 210/691 |
| 3,732,326 | 5/1973 | Chen | 210/691 |
| 4,206,080 | 6/1980 | Sato et al. | 252/430 |
| 4,473,477 | 9/1984 | Beall | 210/691 |
| 4,517,094 | 5/1985 | Beall | 210/664 |
| 4,648,977 | 3/1987 | Garg et al. | 210/673 |
| 4,664,809 | 5/1987 | Fenton et al. | 210/663 |
| 5,057,227 | 10/1991 | Cohen | 210/680 |
| 5,109,933 | 5/1992 | Jackson | 175/66 |
| 5,132,021 | 7/1992 | Alexander | 210/679 |
| 5,248,395 | 9/1993 | Rastelli et al. | 210/669 |

OTHER PUBLICATIONS

Industrial Wastewater, Mar./Apr. 1995; "Granular Activated Carbon vs. Macroreticular Resins" by Jack L. Musterman and Victor J. Boero Dow Chemical Technical Bulletin 3.03 Polymeric Adsorbent XUS 43493.

*Primary Examiner*—Charles T. Jordan
*Assistant Examiner*—Meena Chelliah

[57] ABSTRACT

Volatile organic compounds, including, in particular, the BTEX group, present in wastewater and groundwater in concentrations of about 1.0 PPM to 100 PPM, may be removed by adsorption onto a polymer coated porous substrate. The substrate is preferably selected from a group consisting of mullite, diatomaceous earth and ground structural brick and fire brick. The polymer coatings may be applied by immersing the substrate in a solution of the polymer or the polymer coating may be generated on the substrate by polymerization of a substrate coated resin. Polystyrene, polypropylene glycol, polymethyl silicone, polyesters and polyurethanes may be used as the coating material. The adsorbent composition may be disposed in a packed column, as a liner for storage pits, as a barrier for surface bodies of water and groundwater flow, and may be regenerated or disposed of by deep well injection.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

EXTRACTION AND DISPOSAL OF ORGANIC WASTES WITH POLYMER COATED POROUS SUBSTRATE

Field of the Invention

The present invention pertains to extracting volatile organic compounds, such as benzene, toluene and xylene, from wastewater streams in relatively low concentrations using a polymer coated porous substrate such as an alumino-silicate, diatomaceous earth or ground brick, for example.

Background of the Invention

Efforts to extract organic compositions, including aromatic hydrocarbon compounds, from wastewater streams and other water sources must meet relatively strict regulatory requirements and otherwise comply with acceptable disposal processes. For example, the acceptable level of the so-called BTEX group of hydrocarbons (benzene, toluene, ethylbenzene and xylene) in groundwater, is less than 1.0 parts per million (PPM) as required by many regulatory authorities. Relatively low concentrations (1.0 PPM to 100 PPM, for example) of these hydrocarbon solvents are particularly difficult to extract and retain by known methods and adsorbent compositions. However, suitable extraction and retention of these volatile organic compounds on particulate material, for example, presents certain opportunities for containment and final disposal of these compounds in ways which have been heretofore unappreciated.

Certain macroreticular resin materials have been developed to be used as adsorbents for volatile organic compounds and for removing these compounds from groundwater or wastewater streams. Moreover, granular activated carbon has also been used to remove volatile organic compounds from water. The so-called macroreticular resins are typically provided in the form of plastic beads with relatively large internal surface area. Moreover, polymeric resin type adsorbents can be made from a variety of monomers with different properties which can provide a broad spectrum of surface polarities, surface area, porosity and pore size distribution. Such characteristics give polymeric resins their adsorptive behavior and their affinity for particular types of organic compounds.

However, certain polymer resins can also be advantageously used as adsorbents when applied to a porous substrate which also has properties of large surface area, high porosity, chemical inertness, and ease of mechanical handling, for example. The present invention contemplates the provision of a unique combination of a polymer resin type adsorbent in combination with a supporting substrate comprising a porous, relatively inert material which may be supplied in various particle sizes, may be easily handled and placed in locations wherein significant extraction of low concentrations of volatile organic compounds from various water sources and the like may be obtained. It is to this end that the present invention has been developed.

Summary of the Invention

The present invention provides an improved adsorbent composition particularly advantageous for adsorbing relatively low concentrations of volatile organic compounds from wastewater and groundwater streams. The present invention also provides a unique method for removing relatively low concentrations of volatile organic compounds from water using a unique supporting substrate for a polymer resin type adsorbent.

In accordance with one aspect of the invention an adsorbent for the BTEX solvents is provided by applying a polymer resin coating to a porous substrate selected from a group consisting of alumino-silicates, diatomaceous earth and ground structural brick and fire brick, for example. In particular, the alumino-silicate preferably comprises at least partially crystalline mullite (also known as porcelainite). The polymer coating may be selected from a group consisting of polystyrene polymethyl silicone and copolymers of polybutadiene and polystyrene and may be applied to the surface of a substrate such as mullite, ground brick or diatomaceous earth. The resulting porous, particulate adsorbent composition may be disposed in a packed column, used as a liner for pits and ponds and for certain areas which are likely to become contaminated with flowing groundwater containing volatile organic compounds.

Alternatively, the polymer coated substrate may be slurried and disposed as a barrier in preformed trenches or injected into the soil through relatively shallow injection wells adjacent to areas where known quantities of volatile organic compounds, including the BTEX group, are disposed and which would otherwise migrate away from the identified area with flowing groundwater. The polymer coated substrate may, after use as an adsorbent, be used as a vehicle to dispose of volatile organic compounds, including the BTEX group, by injecting the material into subterranean formations through injection wells and into known containment zones. Still further, the invention contemplates reuse or regeneration of the substrate by suitable stripping or incineration of the adsorbed solvents and the polymer adsorbent followed by recoating of the substrate with the polymer adsorbent.

The invention also contemplates providing an adsorbent composition and method wherein other polymer coatings such as polypropylene glycol, polyesters and polyurethanes may be coated on the porous substrate and used to adsorb other organic compounds including polar compounds, phenols, methylene chloride and trichloroethylene, for example.

Those skilled in the art will further appreciate the above-mentioned advantages and superior features of the invention together with other important aspects thereof upon reading the detailed description which follows in conjunction with the drawing.

Description of Preferred Embodiments

Figure 1:
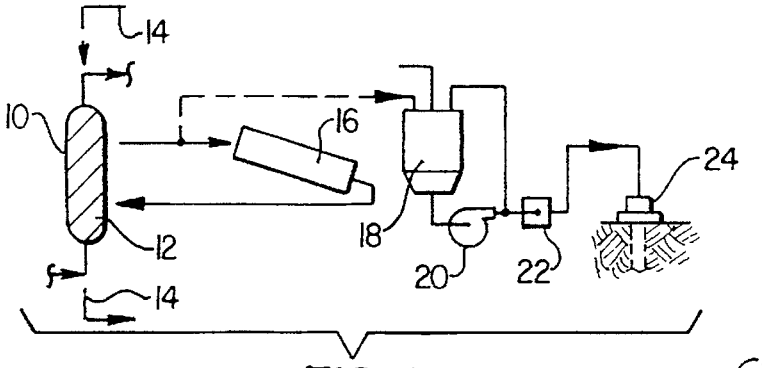
FIG. 1 is a schematic diagram illustrating extraction of volatile organic compounds from a flowstream using the adsorbent composition of the invention and showing alternate methods of disposing of or regenerating the adsorbent composition.

In the description which follows like elements are marked through the specification and drawing with the same reference numerals, respectively. The drawing figures are primarily in schematic form in the interest of clarity and conciseness.

The prolific use of various processed hydrocarbon fluids for myriad purposes has resulted in many instances of actual or potential exposure of these fluids to wastewater flow streams and groundwater, as well as rivers, lakes and reservoirs which receive runoff containing certain ones of such fluids. The so-called BTEX hydrocarbon fluids, benzene, toluene, ethylbenzene and xylene are particularly prevalent. These major aromatic compounds are required by many regulatory authorities to be removed from wastewater flow streams and to be prevented from exposure to groundwater such that the concentration is below a predetermined amount. As mentioned previously, the acceptable level of the so-called BTEX group of hydrocarbons in groundwater is required, in many instances, to be less than 1.0 PPM. Relatively low concentrations (1.0 PPM to 100 PPM) of these hydrocarbons are particularly difficult to extract from water and retain on an adsorbent or absorbent which may then be treated to prevent re-entrance of these compounds into the environment. Other volatile organic compounds (VOC) are subject to the same problems of extraction from water in low concentrations and retention of the extracted material by a suitable adsorbent or absorbent. Certain polymer compounds, phenols and lighter volatiles such as methylene chloride, trichloroethylene, and perchloroethylene present the same problems.

It has been proposed to provide certain polymeric compositions in the form of small beads to act as adsorbents for volatile organic compounds and to remove such compounds from groundwater and wastewater flow streams. Still further, granular activated carbon has been used as an adsorbent for the BTEX group and other volatile organic compounds. However, certain problems arise in the physical handling of these beaded polymer resin adsorbents. The aforementioned materials are not easily used other than in a packed column type vessel, for example. The quantity of adsorbent required may be excessive and expensive if the adsorbent is disposed of by incineration or the like. The aforementioned beaded adsorbents are not easily disposed of, such as by forming a slurry which may then be injected into the earth for disposal in deep injection zones, for example. Still further, certain problems arise in trying to form these resin materials into liners or barriers for lining collection pits or ponds, disposal in trenches or injection into the ground in the vicinity of a plume of hydrocarbon fluid permeating the ground.

Accordingly, there has been a need to provide a composition and method wherein suitable adsorption or extraction of volatile organic compounds, particularly the BTEX group, may be carried out effectively and the adsorbent more easily regenerated or disposed of in ways which have been the subject of several inventions assigned to the assignee of the present invention. For example, the adsorbent composition of the present invention may be disposed of in accordance with the method and apparatus described in U.S. Pat. No. 5,109,933 to J.E. Jackson and assigned to the assignee of the present invention. The injection processes may also be in accordance with those described in U.S. Pat. Nos. 5,226,749 and 5,314,265 to Perkins and Perkins, et al. and also assigned to the assignee of the present invention.

The invention contemplates utilizing the adsorption properties of certain polymer materials disposed on a substrate or support structure comprising a material of high porosity and surface area per unit volume, which material is substantially inert and may be returned to the earth or at least temporarily disposed on or in the earth and may be regenerated and reused or disposed of in accordance with one of the disposal and injection processes described in the above mentioned patents. In particular, the invention contemplates the disposition of a polymer coating on a substrate comprising substantially naturally occurring materials which have a porosity of at least about 40% and a surface area per unit mass of at least about fifty square meters per gram may be easily handled and processed for disposal or may be subjected to regeneration in accordance with known practices. Certain alumino-silicates, diatomaceous earth and conventional structural clay brick and fire brick, ground to a suitable particle size, have been discovered to be advantageous substrates. A polymer coating is applied to the particles of the aforementioned materials, which polymer coating may be modified to increase its affinity for the organic compound or compounds to be extracted from the water flowstream. The porosity of the adsorbent composition is also preferably about 40% or more.

For example, to extract the BTEX group of solvents from water, polystyrene may be coated on one of the aforementioned substrates. Mixtures of polymers may be coated on one of the substrates or structural compositions and the coated composition may be placed in the flow path of the water stream from which the solvents are to be extracted. The adsorbent material may be applied to the substrate as a monomer and the polymerization carried out after application to the substrate. The substrate itself is basically environmentally friendly and thus may be disposed on or in the earth with a polymer coating applied thereto and to be interposed in the flow of contaminated water from which the aforementioned volatile organic compounds are to be extracted. In addition to the BTEX solvents it is contemplated that polyaromatic hydrocarbons, polynuclear materials, polychlorinated biphenyls and pentachlorophenol, for example, may be extracted from water wherein these volatile organic compounds are initially present in relatively low concentrations but which concentrations must be reduced even further, such as to the level indicated above.

Extraction of the BTEX compounds may be carried out, for example, by an adsorbent composition comprising a polymer coated quantity of alumino-silicate material comprising about 70% amorphous alumino-silicate and about 30% crystalline mullite or porcelainite. The alumino-silicate material is provided in various particle sizes ranging from about 20 mesh to as much as 1.0 inch maximum particle size. The larger particle sizes are clinkerlike porous solid particulates. Diatomaceous earth and ground structural clay brick or fire brick may be provided having the same range of particle sizes. Polymer coatings selected from a group consisting of polybutadiene, polystyrene, polypropylene glycol, polymethyl silicone, polyesters, and polyurethane may be applied to one or more of the above mentioned substrates. These polymer resins may be dissolved in a suitable solvent and mixed with a quantity of the substrate followed by evaporation of the solvent, using a vacuum extraction unit, for example. External heat may be applied during extraction of the solvent.

By way of example, a quantity of a mixture of amorphous alumino-silicate and mullite in respective percentages by weight of 70% and 30%, and having a particle size of about 20 mesh was coated with polystyrene dissolved in trichloroethylene. In particular, 2.5 grams of polystyrene foam were dissolved in 100.0 milliliters of trichloroethylene. This solution was mixed with 50 grams of the mullite/amorphous alumino-silicate and the solvent was drawn off using a vacuum extraction unit (about 26" Hg vacuum over a 48 to 72 hour period). External heat was applied for about the first hour of vacuum extraction of the solvent. The residue of particulate material coated with the polystyrene was then heated at about 200° F. in an oven for one hour and the resulting granular material was then exposed to a quantity of 3% sodium chloride brine, including concentrations of 14 PPM of each of the BTEX solvents. The percent extraction of benzene was about 67.8%, toluene 82.9%, ethyl benzene 91.7%, p-xylene 92.2% and o-xylene 89.1%. The organophilicity of the polystyrene coating on the mullite substrate was indicated to be significant.

The above-mentioned process was repeated using ground structural clay brick having the same particle size and with substantially the same results.

Greater extraction of benzene may be accomplished by providing a quantity of the mullite substrate coated with polyvinyl benzene, for example. As mentioned above, if other aromatic organics are identified the composition of the polymer coating may be modified to increase its affinity for the material to be extracted. Still further, the invention contemplates the provision of copolymers applied as a coating to the surface of a substrate of the type described herein. For example, to extract the BTEX compounds, a copolymer comprising polybutadiene and polystyrene may be applied to the surface of a substrate comprising one of diatomaceous earth, alumino-silicates, including mullite, and ground structural brick or fire brick having particle sizes of between 20 mesh and nominal 1.0 inch maximum particle dimension.

Extraction of selected volatile organic compounds, particularly the BTEX compounds, may be carried out by flowing contaminated water through a packed column, shown in FIG. 1 and generally designated by the numeral 10. The packed column 10 may have a packing of a mixture of amorphous silicate and mullite in the proportions described above coated with polystyrene, which material is indicated by the numeral 12 in FIG. 1. After a predetermined quantity of contaminated water has been treated the adsorbent composition 12 may be regenerated by reverse flow of steam by way of a flow path 14, for example, through the column 10 to strip the adsorbed aromatics and other volatiles from the adsorbent composition 12. Alternatively, the adsorbent composition 12 may be removed from the column 10 and subjected to incineration in a suitable incinerator, such as a kiln 16 shown schematically in FIG. 1. Incineration would require recoating the substrate with the polymer material prior to reintroduction into the column 10.

Still further, the adsorbent composition removed from the column 10 may be treated in accordance with the method described in U.S. Pat. No. 5,109,933 to Jackson wherein the adsorbent composition is conveyed to a mixing tank 18, mixed with water and the particle size is further reduced by a suitable device such as a centrifugal pump 20, which may recirculate the adsorbent composition back to the tank 18 or directly to an injection pump 22 for injection into a suitable disposal well 24. Additional materials including cementitious materials such as Portland cement and slag, viscosifiers and dispersants, may be added to the tank 18 to form a slurry which is suitable for injection into the well and into a subterranean storage zone.

Figure 2:
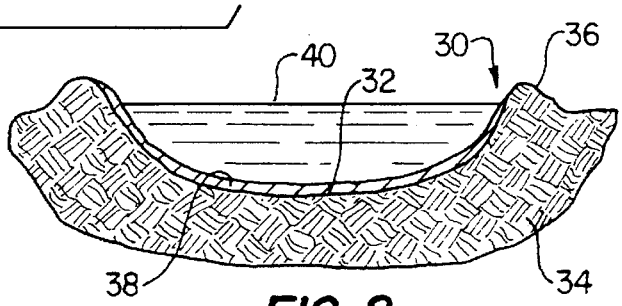
FIG. 2 is a somewhat schematic view showing disposition of the extraction or adsorbent composition as a liner for a pit or pond.

Referring now to FIG. 2, there is illustrated another method of extracting BTEX compounds and similar volatile organic compounds from water and preventing migration of such compounds through the ground. FIG. 2 illustrates a storage pond or pit 30 which comprises a recess 32 in the earth 34 which may or may not have a suitable peripheral retention wall or levee 36 and which is lined with a quantity of an adsorbent composition in accordance with the invention and generally designated with the numeral 38. Accordingly, contaminated water or other liquid 40 disposed in the pit 30, if seeping into the earth 34, will have the BTEX or other volatile solvents extracted therefrom by the layer of adsorbent composition 38. The adsorbent composition 38 may be the aforementioned polymer coated substrate selected from the group consisting of alumino-silicates, mullite, diatomaceous earth and ground brick materials. The liner of adsorbent composition 38 may be compacted sufficiently to provide some binding effect between the particles if there is likely to be any turbulence of fluid flowing into or out of the pit 30.

Figure 3:
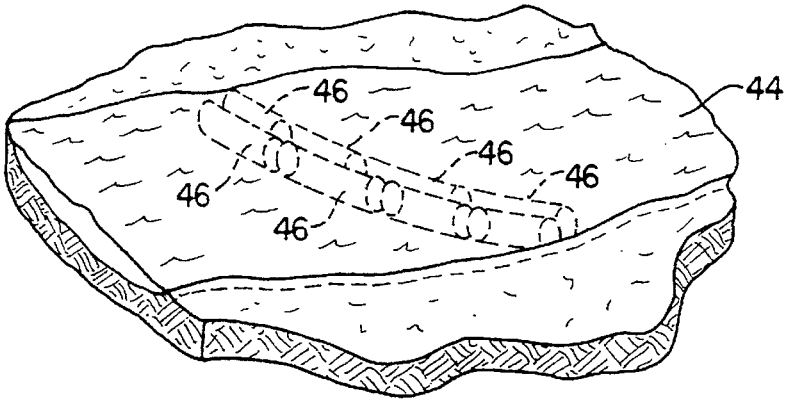
FIG. 3 is a somewhat schematic view showing deployment of barrier members of the adsorbent composition of the invention in a stream contaminated with volatile organic compounds.

Referring now to FIG. 3, there is illustrated a body of water comprising a free flowing natural stream 44 which has been contaminated with BTEX or other volatile organic compounds and for which a quantity of adsorbent composition in accordance with the invention is disposed in the form of plural compacted logs 46 which have been deposited across the bed of the stream 44 to form a porous barrier through which the stream water flows. The logs 46 may be formed as porous solid members using a suitable binder for the substrate to provide a cohesive mass of material. One of the aforementioned polymers may, in fact, serve to bind the particles of substrate together to form a cohesive solid.

Figure 4:
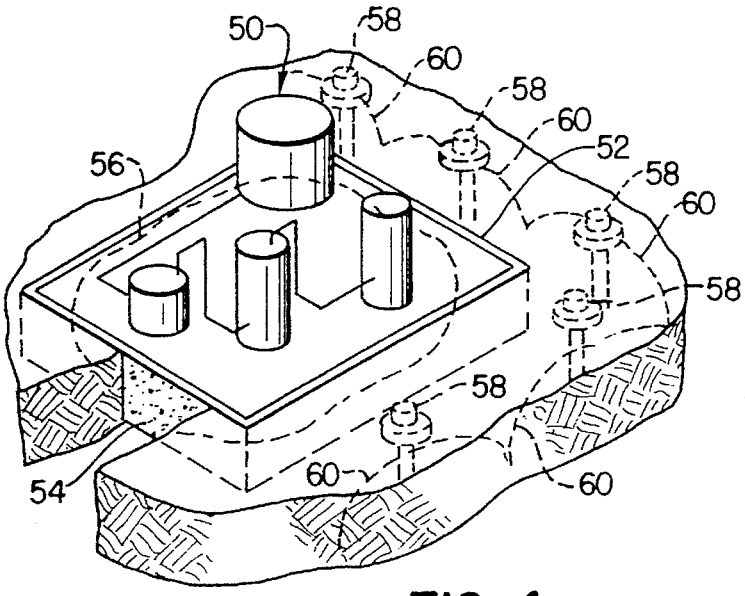
FIG. 4 is a diagram showing alternate methods of placing the adsorbent composition around a source of ground contamination such as a refinery or petrochemical processing facility.

The invention further contemplates forming suitable barriers of adsorbent composition to prevent migration of BTEX and similar volatile organics away from a site or facility wherein these materials have been inadvertently spilled on the ground. FIG. 4 shows a refinery or chemical processing facility 50, by way of example. The perimeter of the facility 50 is provided with suitable trench means 52 filled with a quantity of adsorbent composition 54 comprising one of the above-mentioned substrates suitably coated with one of the above-mentioned polymers to prevent outward migration of contaminated groundwater away from the facility 50. A plume 56 of contaminated earth is disposed within the perimeter of the trench means 52 which, upon growth and coming into contact with the layer of adsorbent 54 disposed in the trench means will have the volatile organic compounds removed therefrom and prevent migration of such organic compounds away from the site of the facility 50.

The perimeter barrier, provided by the trench means 52 containing the adsorbent composition 54, may also be provided by a plurality of relatively shallow injection wells 58 formed in a suitable pattern about the periphery of the facility. The wells 58 are shown extending along two sides of the facility 50, by way of example in FIG. 4. A slurry of adsorbent composition of the invention may be injected into the earth from the wells 58 to form contiguous or overlapping barrier plumes 60 of the adsorbent composition, which plumes may be confined in generally vertical fractures in the earth which will prevent migration of volatile organic compounds beyond the adsorbent barrier. The orientation of the barrier plumes 60 may be controlled to some extent by the orientation of perforations in suitable casing or well conduits of the wells 58. A slurry of adsorbent composition suitable for injection through the injection wells 58 may also be prepared in accordance with the teaching of U.S. Pat. No. 5,109,933.

Although preferred embodiments of a unique adsorbent composition, and methods for disposing of volatile organic compounds, in accordance with the present invention have been described hereinabove in detail those skilled in the art will recognize that various substitutions and modifications may be made without departing from the scope and spirit of the appended claims.

What is claimed is:

1. A method for removing at least a major portion of volatile organic compounds selected from the group consisting of benzene, toluene, ethylbenzene and xylene from contaminated water containing from about 1.0 to about 100 PPM of at least one of the volatile organic compounds by a method consisting essentially of:

a) coating an environmentally inert porous high surface area particulate material having a porosity of at least about 40%, a surface area of at least 50 square meters per gram and a particle size from about 20 mesh to up to about 1.0 inch in maximum particle size with a polymer coating of a polymer selected from the group consisting of polystyrene, polybutadiene, polypropylene glycol, polymethyl silicone, polyesters and polyurethane to produce an adsorbent composition b) contacting the contaminated water with the adsorbent composition to adsorb at least a major portion of the volatile organic compounds from the contaminated water and produce an at least partially spent adsorbent composition.

2. The method set forth in claim 1 wherein:

said adsorbent composition is disposed in a column and said contaminated water is passed through said column to absorb said volatile organic compounds onto said polymer coating.

3. The method set forth in claim 2 including the step of:

regenerating said at least partially spent adsorbent composition by passing steam through said column to strip said volatile organic compounds from said polymer coating.

4. The method set forth in claim 1 including the step of:

regenerating said at least partially spent adsorbent composition by incinerating said at least partially spent adsorbent composition and thereafter recoating said particulate material with a polymer coating.

5. The method set forth in claim 1 including the step of:

forming a slurry of the at least partially spent adsorbent composition, passing the slurry through a centrifugal pump to reduce the at least partially spent adsorbent composition to a particle size of about 200 microns or smaller and thereafter injecting said slurry into a subterranean earth formation.

6. The method set forth in claim 1 including the step of:

exposing said adsorbent composition to said contaminated water by lining a pit containing said contaminated water with a layer of said adsorbent composition such that contaminated water leaking from said pit into an earth formation must pass through said layer of said adsorbent composition.

7. The method set forth in claim 1 including the step of:

exposing said adsorben composition to contaminated water in a body of water by forming a barrier of said adsorbent composition in said body of water to require contaminated water in said body of water to flow through said adsorbent composition.

* * * * *